US012180756B2

(12) United States Patent
Ando et al.

(10) Patent No.: US 12,180,756 B2
(45) Date of Patent: Dec. 31, 2024

(54) VEHICLE DOOR OPERATING DEVICE

(71) Applicant: MITSUI KINZOKU ACT CORPORATION, Yokohama (JP)

(72) Inventors: Kosuke Ando, Yokohama (JP); Fuyuki Nakatsuka, Yokohama (JP); Jain Anil, Yokohama (JP); Ahmed Tanveer, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 214 days.

(21) Appl. No.: 17/889,227

(22) Filed: Aug. 16, 2022

(65) Prior Publication Data

US 2023/0054429 A1 Feb. 23, 2023

(30) Foreign Application Priority Data

Aug. 17, 2021 (JP) ................................ 2021-132731

(51) Int. Cl.
*E05B 81/90* (2014.01)
*E05B 81/16* (2014.01)
*E05B 83/38* (2014.01)

(52) U.S. Cl.
CPC .............. *E05B 81/90* (2013.01); *E05B 81/16* (2013.01); *E05B 83/38* (2013.01)

(58) Field of Classification Search
CPC .......... E05B 81/00; E05B 81/02; E05B 81/12; E05B 81/16; E05B 81/18; E05B 81/20; E05B 81/21; E05B 81/32; E05B 81/34; E05B 81/36; E05B 81/38; E05B 81/80; E05B 81/90; E05B 83/36; E05B 83/38
USPC ............................................................ 70/465
See application file for complete search history.

(56) References Cited

U.S. PATENT DOCUMENTS

2009/0236863 A1* 9/2009 Akizuki .................. E05B 81/14 292/201
2016/0010365 A1* 1/2016 Hanaki ................... E05B 79/20 292/45
2019/0093397 A1* 3/2019 Krishnan ................ E05B 81/58

FOREIGN PATENT DOCUMENTS

JP 2005-88813 4/2005
WO WO-2020079989 A1 * 4/2020

* cited by examiner

*Primary Examiner* — Nathan Cumar
(74) *Attorney, Agent, or Firm* — NIXON & VANDERHYE

(57) ABSTRACT

A vehicle door operating device including: a closing latch unit holding a door in a closed position, wherein the door is supported on a vehicle body to open and close; a fully opening latch unit holding the door in a fully open position; an actuator having a motor; an emergency handle operated manually from a vehicle interior side; and an operation relay unit which operates the closing latch unit and the fully opening latch unit to be unlatched respectively when driven by the actuator, and operates the closing latch unit to be unlatched when manually operated by the emergency handle such that the closing latch unit is held in an unlatched state.

14 Claims, 13 Drawing Sheets

VEHICLE DOOR OPERATING DEVICE

CROSS-REFERENCE TO RELATED APPLICATION

This application claims priority to JP 2021-132731 filed Aug. 17, 2021, the entire contents of which are hereby incorporated by reference.

FIELD OF THE INVENTION

The present invention relates to a vehicle door operating device, particularly relates to a vehicle door operating device without a mechanical door handle.

BACKGROUND OF THE INVENTION

JP 2005-88813 A describes a vehicle having bi-parting doors which are front and rear sliding doors opening and closing an entrance provided on a side surface of a vehicle body in a longitudinal direction with an approximate center of the entrance as a boundary. The front sliding door slides frontward to open the front half of the entrance, and the rear sliding door slides rearward to open the rear half of the entrance.

Recently, regarding a vehicle such as particularly a ride-share car, motorizing moving parts and automatic operation are promoted. Particularly, regarding a sliding door enabled to automatically open and close by electrical power, a sliding door without a mechanical door handle operated when opening and closing a conventional sliding door has come out thanks to that a closing latch unit holding the sliding door in a closed position and a fully opening latch unit holding the sliding door in a fully open position are unlatched with electrical power.

SUMMARY OF THE INVENTION

However, regarding a vehicle having a sliding door without a mechanical door handle, when an electrical system failure occurs, the sliding door is made to be impossible to open. A means for solving such a matter, from a standpoint of preventing invasion into the vehicle interior by an unauthorized person, it can be thought that an emergency handle operatable only from a vehicle interior side when an electrical system failure occurs is made to be provided inside of the vehicle. However, even if such an emergency handle is provided inside of the vehicle, when a user gets off the vehicle and closes the sliding door from a vehicle exterior side after the user opens the sliding door from the vehicle interior side based on the operation of the emergency handle, the closing latch unit is made to be in the latched state and the sliding door is held in the closed position, and the sliding door cannot be opened again. Thus, such a matter may affect adversely subsequent repairs.

Therefore, it is required that after a sliding door is opened by an emergency handle, the sliding door is prevented from being held in a closed position until a vehicle is transported to a repair shop such that subsequent repairs can be easily conducted.

In view of the above disadvantages, an object of the present invention is to provide a vehicle door operating device by which a door is prevented from being held in a closed position after the door is opened by an emergency handle.

According to the present invention, the above problems are solved as follows. Namely, a vehicle door operating device comprises;

a closing latch unit holding a door in a closed position, wherein the door is supported on a vehicle body to open and close;

a fully opening latch unit holding the door in a fully open position;

an actuator having a motor;

an emergency handle operated manually from a vehicle interior side; and an operation relay unit which operates the closing latch unit and the fully opening latch unit to be unlatched respectively when driven by the actuator, and operates the closing latch unit to be unlatched when manually operated by the emergency handle such that the closing latch unit is held in an unlatched state.

According to the vehicle door operating device of the present invention, since a door is prevented from being held in a closed position after the door is opened by an emergency handle when an electrical system failure occurs to make an actuator to be impossible to drive, subsequent repairs can be easily conducted.

EMBODIMENTS OF THE INVENTION

The present invention is explained by referring to an embodiment on the basis of the drawings as follows. However, the present invention is not limited to the following embodiment, and proper changes and modifications may be added to the following embodiment within an obvious scope to a person skilled in the art.

Figure 1:
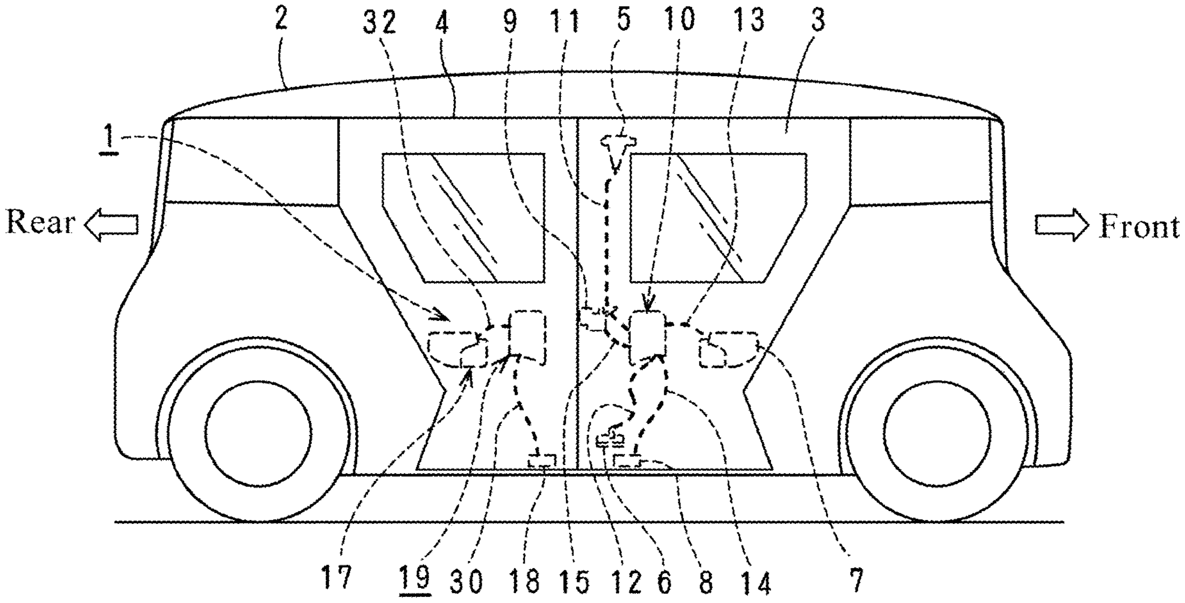
FIG. 1 is a right-side elevational view showing a vehicle applied with a vehicle door operating device of the present invention.

FIG. 1 is a right-side elevational view showing a vehicle applied with a vehicle door operating device 1 of the present invention. This vehicle has bi-parting doors which are front and rear sliding doors 3, 4 capable of opening and closing an entrance provided on a side surface of a vehicle body 2, and its vehicle exterior and interior sides are not respectively provided with a door handle and a lock knob which are usually possible to be operated manually by a user. The vehicle door operating device 1 of the present embodiment is applied to the rear sliding door 4. However, the present invention is not limited to the present embodiment, and can be applied to the front sliding door 3, too. Doors 3, 4 are respectively operated to open and close by driving of an actuator 101, 26 later described having an electric driving source driven based on an operation of a remote operation switch carried by a user or an operation switch provided on each of the doors 3, 4.

The front sliding door 3 is supported to be movable in a longitudinal direction respectively by an upper guide rail not shown fixed to a front upper portion of the entrance, a center guide rail not shown fixed to a front middle portion of the vehicle body 2, and a lower guide rail not shown fixed to a front lower portion of the entrance. The front sliding door 3 is operated to open automatically in a frontward direction from a closed position shown in FIG. 1 by the motive power of a motor and so on of an automatic opening/closing device not shown provided in the vehicle body 2 to open a front half of the entrance, and is operated to close automatically in a rearward direction from a fully open position to close the front half of the entrance.

The rear sliding door 4 is supported to be movable in the longitudinal direction respectively by an upper guide rail not shown fixed to a rear upper portion of the entrance, a center guide rail not shown fixed to a rear middle portion of the vehicle body 2, and a lower guide rail not shown fixed to a rear lower portion of the entrance. The rear sliding door 4 is operated to open automatically in a rearward direction from a closed position shown in FIG. 1 by the motive power of a motor and so on of an automatic opening/closing device not shown provided in the vehicle body 2 to open a rear half of the entrance, and is operated to close automatically in a frontward direction from a fully open position to close the rear half of the entrance.

Figure 2:
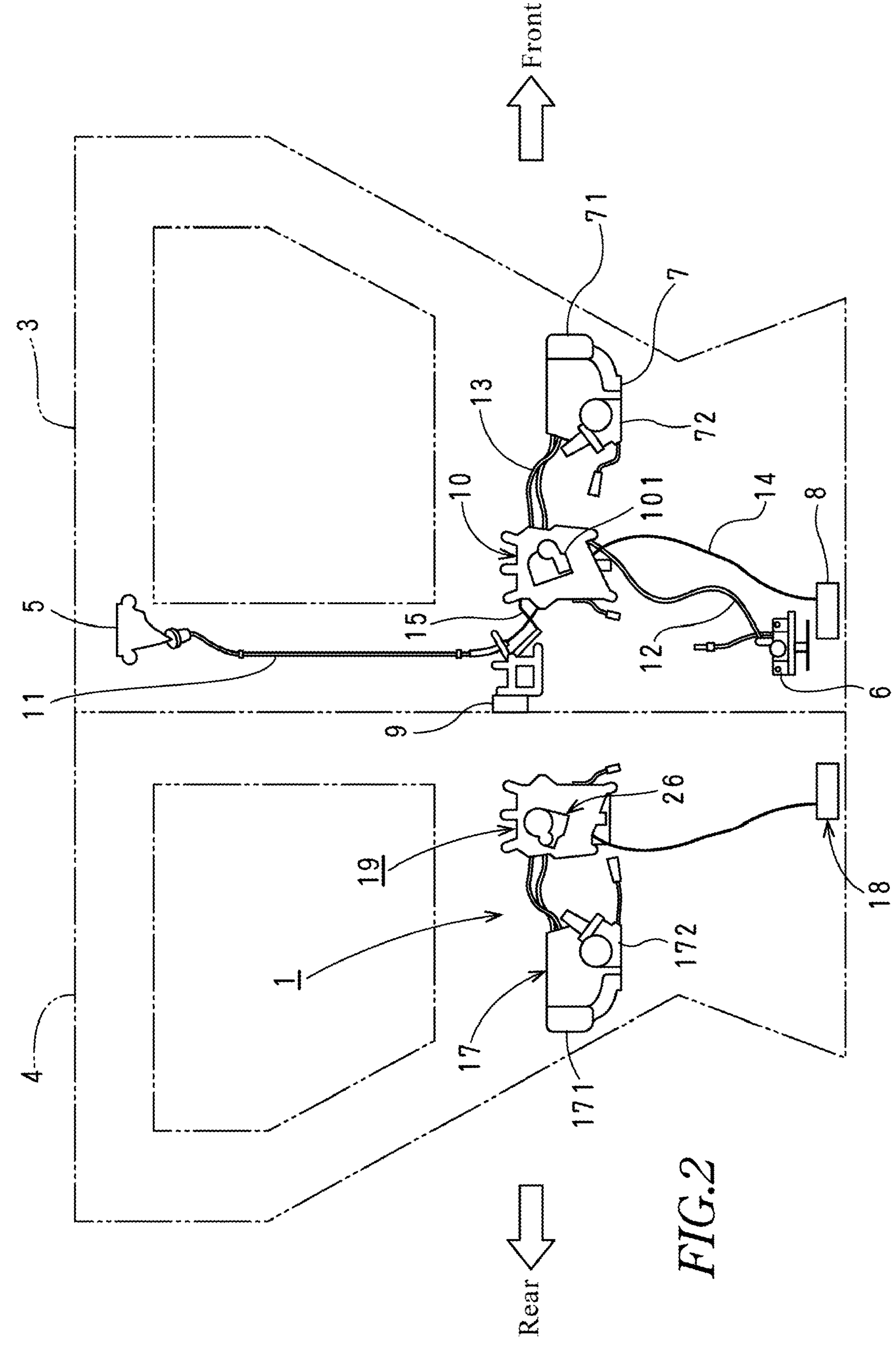
FIG. 2 is a right-side elevational view showing each internal configuration of front and rear sliding doors.

As shown in FIGS. 1, 2, the front sliding door 3 is provided with the following components:

upper and lower closing latch units 5, 6 holding the front sliding door 3 in the closed position by respectively engaging with strikers not shown fixed to upper and lower portions of the vehicle body 2, a center closing latch unit 7 holding the front sliding door 3 in the closed position together with the upper and lower closing latch units 5, 6 by engaging with a striker not shown fixed to the vehicle body 2, a fully opening latch unit 8 holding the front sliding door 3 in the fully open position by engaging with a fully opening striker not shown fixed to the vehicle body 2, an emergency handle 9 operated when an emergency occurs, and an operation relay unit 10 with which the closing latch units 5, 6, 7, the fully opening latch unit 8 and the emergency handle 9 are connected respectively.

The front sliding door 3 is not provided with a mechanical door handle to open it and an operation knob for locking/unlocking. Thus, each releasing operation of the closing latch units 5, 6, 7 when opening the front sliding door 3 and a releasing operation of the fully opening latch unit 8 when closing the front sliding door 3 are usually conducted by an electric actuator 101 provided in the operation relay unit 10 except the emergency.

The center closing latch unit 7 includes a latch mechanism 71 engaging with the striker not shown to hold the front sliding door 3 in the closed position, and an electric closure mechanism 72 forcibly moving the front sliding door 3 with an electromotive power from a position just before the closed position (half-latch position) to the closed position (full-latch position).

The emergency handle 9 is provided on a rear end surface of the front sliding door 3, is impossible to be operated by covering it with a front end surface of the rear sliding door 4 when both front and rear sliding doors 3, 4 are closed, and is allowed to appear to be operatable by opening the rear sliding door 4. Thus, even if an emergency occurs such that driving the actuator 101 is made to be impossible by generating an accident in an electric system, when the rear sliding door 4 is in a state of open, the closing latch units 5, 6, 7 are respectively operated to be unlatched by operating the emergency handle 9 such that the front sliding door 3 can be opened.

The operation relay unit 10 respectively operates the upper closing latch unit 5, the lower closing latch unit 6, the center closing latch unit 7, and the fully opening latch unit 8 to be released based on the electric driving of the actuator 101 or the manual operation of the emergency handle 9 thanks to that various levers are respectively coupled with the upper closing latch unit 5, the lower closing latch unit 6, the center closing latch unit 7, the fully opening latch unit 8, and the emergency handle 9 via respective operation force transmitting members 11, 12, 13, 14, 15 such as Bowden cables. Incidentally, the operation relay unit 10 of the front sliding door 3 has a front-rear symmetrical structure with an operation relay unit 19 described below provided in the rear sliding door 4 and has the same basic configuration as the operation relay unit 19, and thus a detailed explanation of the operation relay unit 10 is omitted.

The rear sliding door 4 is provided with the following components:

a closing latch unit 17 holding the rear sliding door 4 in the closed position by engaging with a closing striker 16 (see FIG. 8) fixed to the vehicle body 2, a fully opening latch unit 18 holding the rear sliding door 4 in the fully open position by engaging with a fully opening striker not shown fixed to the vehicle body 2, and the operation relay unit 19 with which the latch units 17, 18 are connected respectively.

The rear sliding door 4 is not provided with a mechanical door handle. Thus, a releasing operation of the closing latch unit 17 when opening the rear sliding door 4 and a releasing operation of the fully opening latch unit 18 when closing the rear sliding door 4 are usually conducted by an electric actuator 26 provided in the operation relay unit 19 except the emergency such as an electrical system failure.

The closing latch unit 17 includes a latch mechanism 171 engaging with the closing striker 16 to hold the rear sliding door 4 in the closed position, and a closure mechanism 172 forcibly moving the rear sliding door 4 with an electromotive power from a position just before the closed position (half-latch position) to the closed position (full-latch position).

As shown in FIGS. 8 to 11, the latch mechanism 171 includes a latch 173 pivotably supported to a base not shown to be capable of engaging with the closing striker 16 when the rear sliding door 4 is closed, and a ratchet 174 pivotably supported to the base to engage with an engagement claw portion 173*a* formed on the latch 173 such that it is capable of holding an engagement state between the latch 173 and the closing striker 16 by preventing the latch 173 engaging with the closing striker 16 from pivoting.

Incidentally, the expression "latched state" used in the explanation of the present embodiment is defined as a state that the closing striker 16 engages with the latch 173 and the ratchet 174 engages with the engagement claw portion 173*a* of the latch 173, and the expression "unlatched state" is defined as a state that the ratchet 174 disengages from the engagement claw portion 173*a* of the latch 173.

As shown in FIGS. 3 to 7, the operation relay unit 19 includes;

- a baseplate 20 fixed to an inner side surface of an inner panel of the rear sliding door 4;
- a fully-open-state releasing lever 22, a closed-state releasing lever 23, and an emergency lever 24 which are respectively supported in a pivotable manner by a shaft 21 oriented in a vehicle transverse direction;
- a holding member 25 capable of holding the emergency lever 24 in an unlatching position;
- the electric actuator 26 in which a motor 262 is mounted;
- an emergency handle 27 fixed to the shaft 21; and
- a guard plate 28 fixed to the baseplate 20.

The actuator 26 includes;

- a casing 261 fixed to a vehicle-exterior-side surface of the baseplate 20;
- the motor 262 mounted in the casing 261 and reduction gears 263, 264, 265 reducing a rotation of the motor 262; and
- an output lever 266 pivotably supported to the casing 261 to be capable of integrally pivoting with the last reduction gear 265.

Figure 3:
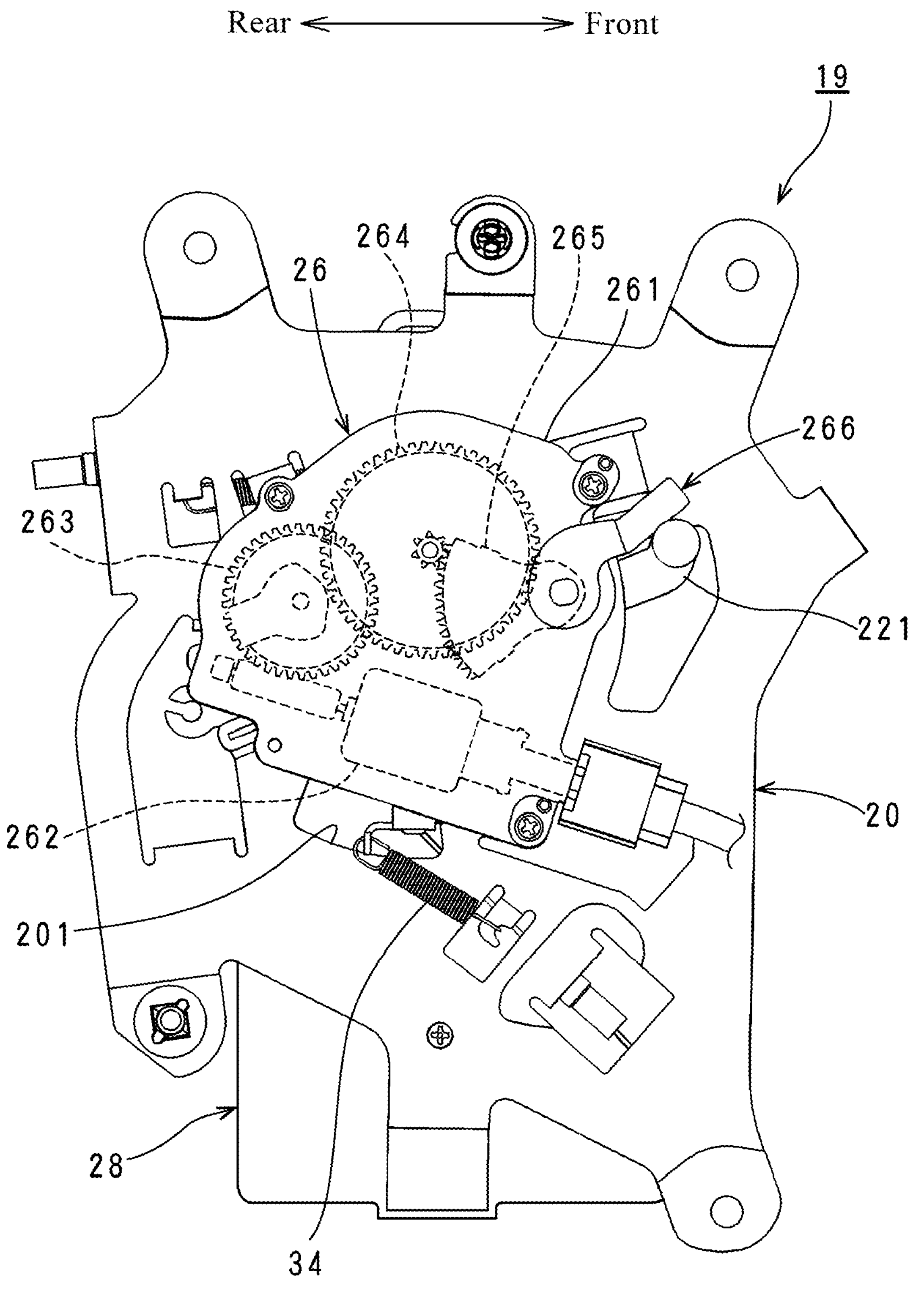
FIG. 3 is a side view showing an operation relay unit seen from a vehicle exterior side.
Figure 4:
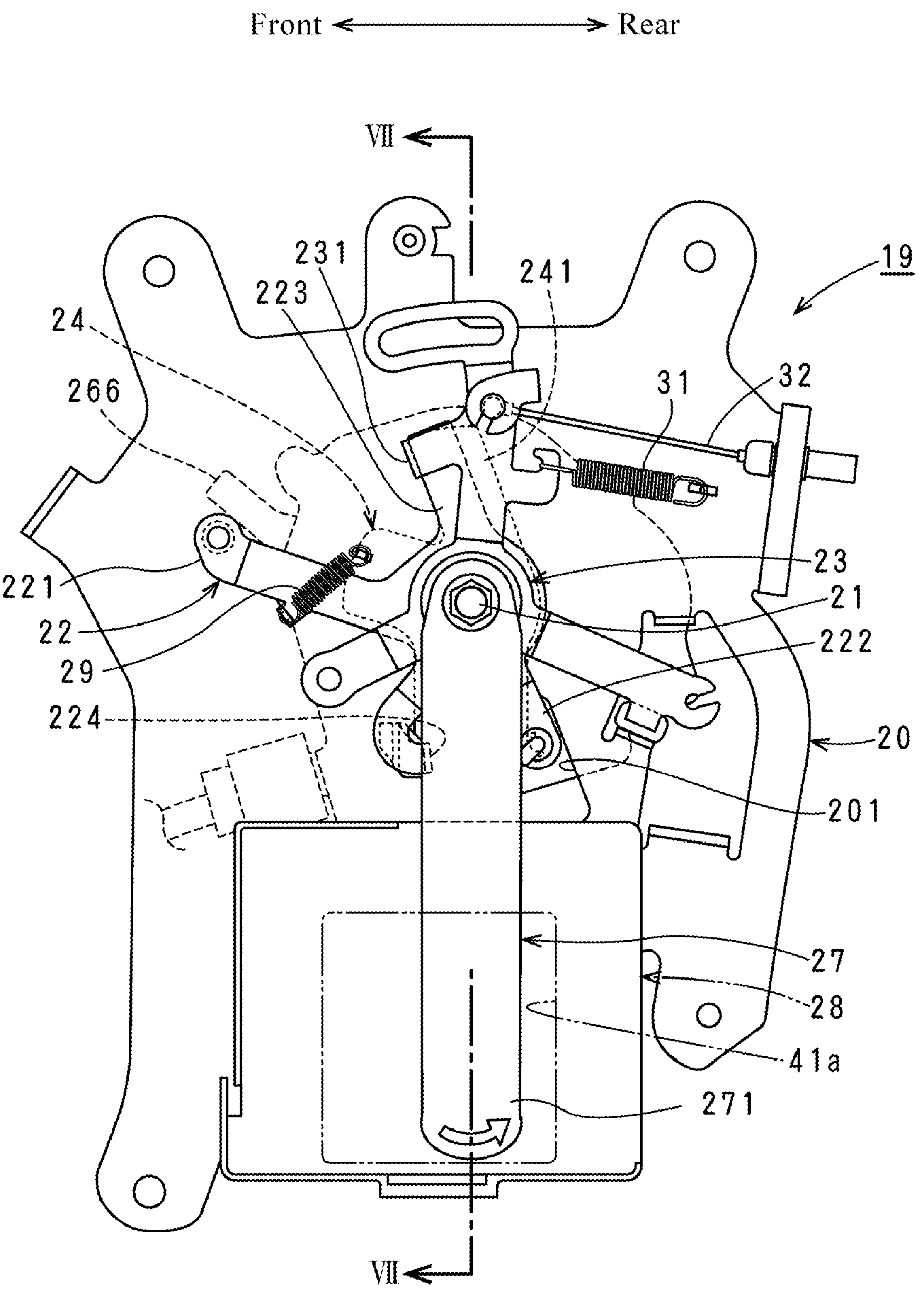
FIG. 4 is a side view showing the operation relay unit seen from a vehicle interior side.
Figure 5:
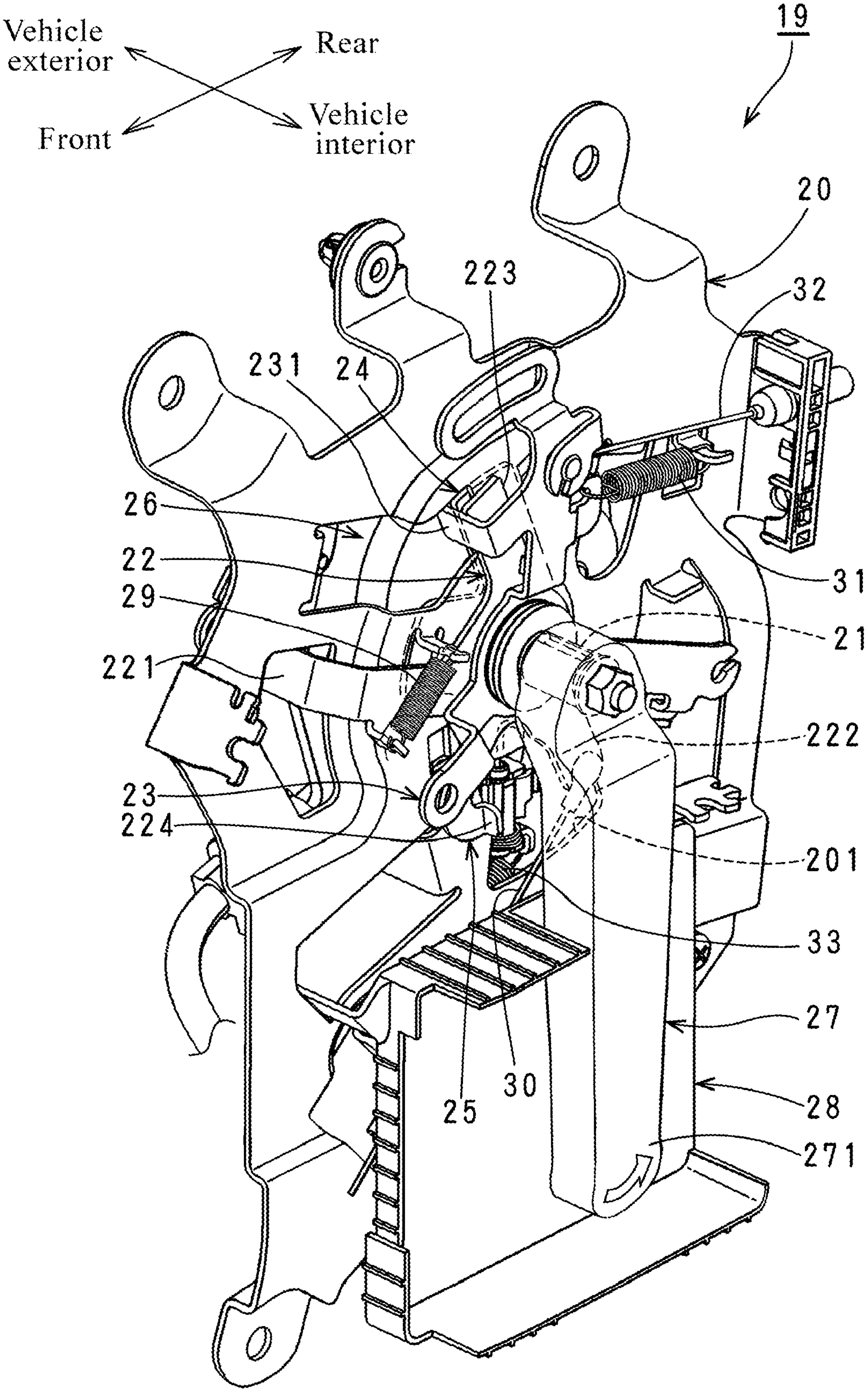
FIG. 5 is a perspective view showing the operation relay unit.

The motor 262 is driven by the operation of the switch carried by a user or the operation switch provided on the rear sliding door 4 to allow the output lever 266 to pivot at a predetermined angle from an initial position (shown in FIGS. 3, 4) in an unlatching direction (a clockwise direction in FIG. 3 and a counterclockwise direction in FIG. 4). Thus, the motor 262 operates the fully-open-state releasing lever 22 and the closed-state releasing lever 23 to be released and allows the rear sliding door 4 to operate to close and open, as described below.

The fully-open-state releasing lever 22 is pivotably supported on a vehicle-interior-side surface of the baseplate 20 by the shaft 21 to be capable of pivoting independently from the shaft 21, is biased in the clockwise direction in FIG. 4 by a spring 29 to be held in an initial position shown in FIG. 4, and is allowed to pivot at a predetermined angle from the initial position in an unlatching direction (the counterclockwise direction in FIG. 4) according to the operation of the output lever 266 of the actuator 26 in the unlatching direction.

The fully-open-state releasing lever 22 has;

- a first arm portion 221 against which the output lever 266 can abut from above when the output lever 266 operates in the unlatching direction by driving of the actuator 26;
- a second arm portion 222 with which an upper end portion of a first operation force transmitting member 30 such as a Bowden cable is coupled, wherein a lower end portion of the first operation force transmitting member 30 is coupled with a ratchet not shown of the fully opening latch unit 18;
- a third arm portion 223 capable of transmitting the operation of the fully-open-state releasing lever 22 in the unlatching direction according to the operation of the output lever 266 in the unlatching direction to the closed-state releasing lever 23; and
- a releasing portion 224 capable of disengaging an engagement relation between the holding member 25 in an engagement position described below and an engaged portion 201*a* described below by the operation of the fully-open-state releasing lever 22 in the unlatching direction according to the operation of the output lever 266 in the unlatching direction.

According to the above-described formation, the fully-open-state unlatching lever 22 operates from the initial position shown in FIG. 4 in the counterclockwise direction (unlatching direction) by the operation of the output lever 266 of the actuator 26 in the unlatching direction. Then, the operation of the fully-open-state unlatching lever 22 in the unlatching direction is transmitted to the ratchet of the fully opening latch unit 18 and the closed-state releasing lever 23 via the first operation force transmitting member 30 and the third arm portion 223 respectively.

The closed-state releasing lever 23 is pivotably supported on the vehicle-interior-side surface of the baseplate 20 by the shaft 21 to be capable of pivoting independently from the shaft 21 and the fully-open-state releasing lever 22, is biased in the clockwise direction in FIG. 4 by a spring 31 to be held in an initial position shown in FIG. 4, and is operated from the initial position (shown in FIG. 4) in the counterclockwise direction shown in FIG. 4 (unlatching direction) according to the operation of the fully-open-state releasing lever 22 in the unlatching direction as described above.

The closed-state releasing lever 23 is coupled with a front end portion of a second operation force transmitting member 32 such as a Bowden cable, wherein a rear end portion of the second operation force transmitting member 32 is coupled with the ratchet 174 of the closing latch unit 17. Thus, the operation of the closed-state releasing lever 23 in the unlatching direction is transmitted to the ratchet 174 of the closing latch unit 17 via the second operation force transmitting member 32 to operate the ratchet 174 to be unlatched. Moreover, the closed-state releasing lever 23 is provided with an abutted portion 231 formed to be bent to abut against the third arm portion 223 of the fully-open-state releasing lever 22 such that the closed-state releasing lever 23 can linkingly move with the fully-open-state releasing lever 22 when the fully-open-state releasing lever 22 operates in the unlatching direction.

Figure 8:
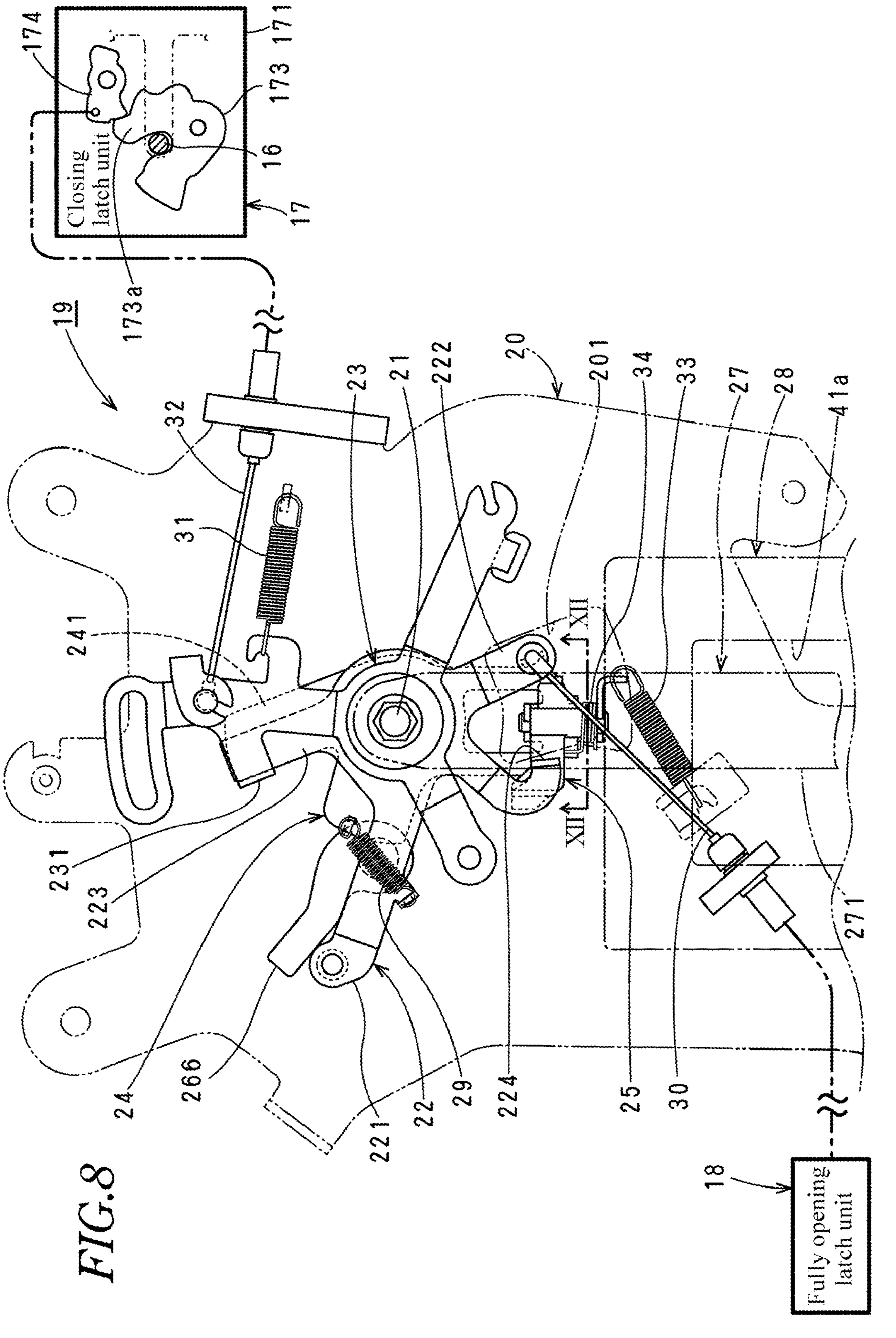
FIG. 8 is a side view showing a principal part of the operation relay unit in an initial state.
Figure 9:
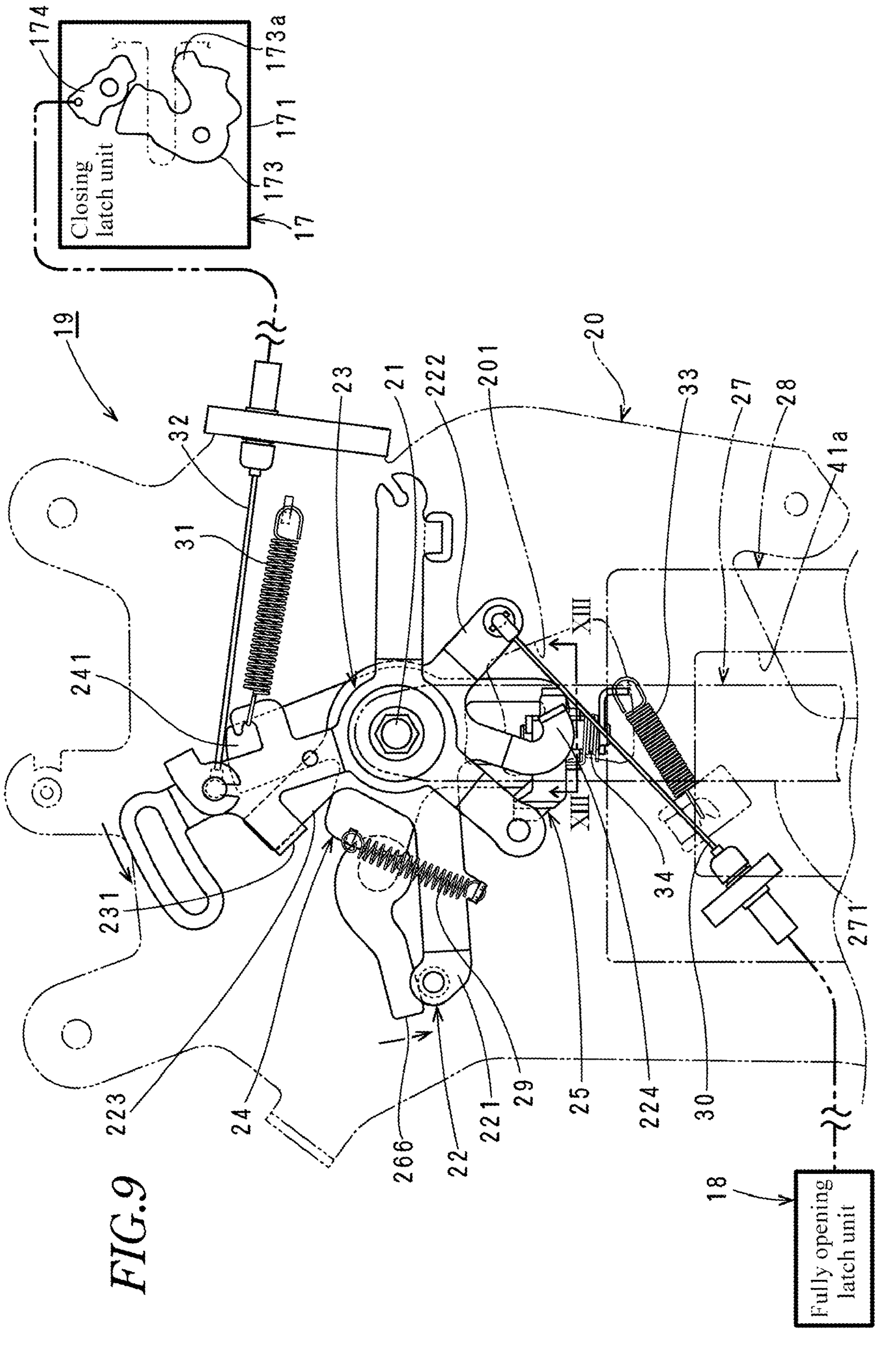
FIG. 9 is a side view showing the operation relay unit when an actuator drives.

The emergency lever 24 is pivotably supported to the baseplate 20 by the shaft 21 between the vehicle-exterior-side surface of the baseplate 20 and the actuator 26 to pivot integrally with the emergency handle 27, is biased in the clockwise direction in FIG. 8 by a spring 33 to be held in the initial position shown in FIG. 8, and is allowed to pivot at a predetermined angle from an initial position in an unlatching direction (the counterclockwise direction in FIG. 8) according to the manual operation of the emergency handle 27. Incidentally, the emergency lever 24 does not operate in the unlatching direction by the driving of the actuator 26.

The manual operation of the emergency lever 24 is transmitted to only the closed-state releasing lever 23, that is, only the ratchet 174 of the closing latch unit 17 without transmitted to the fully-open-state releasing lever 22, that is, the ratchet of the fully opening latch unit 18. The operation of the emergency lever 24 to the closed-state releasing lever 23 is transmitted by abutting an upper arm portion 241 formed on an upper portion of the emergency lever 24 against the abutted portion 231 of the closed-state releasing lever 23 from the counterclockwise direction in FIG. 8.

Figure 10:
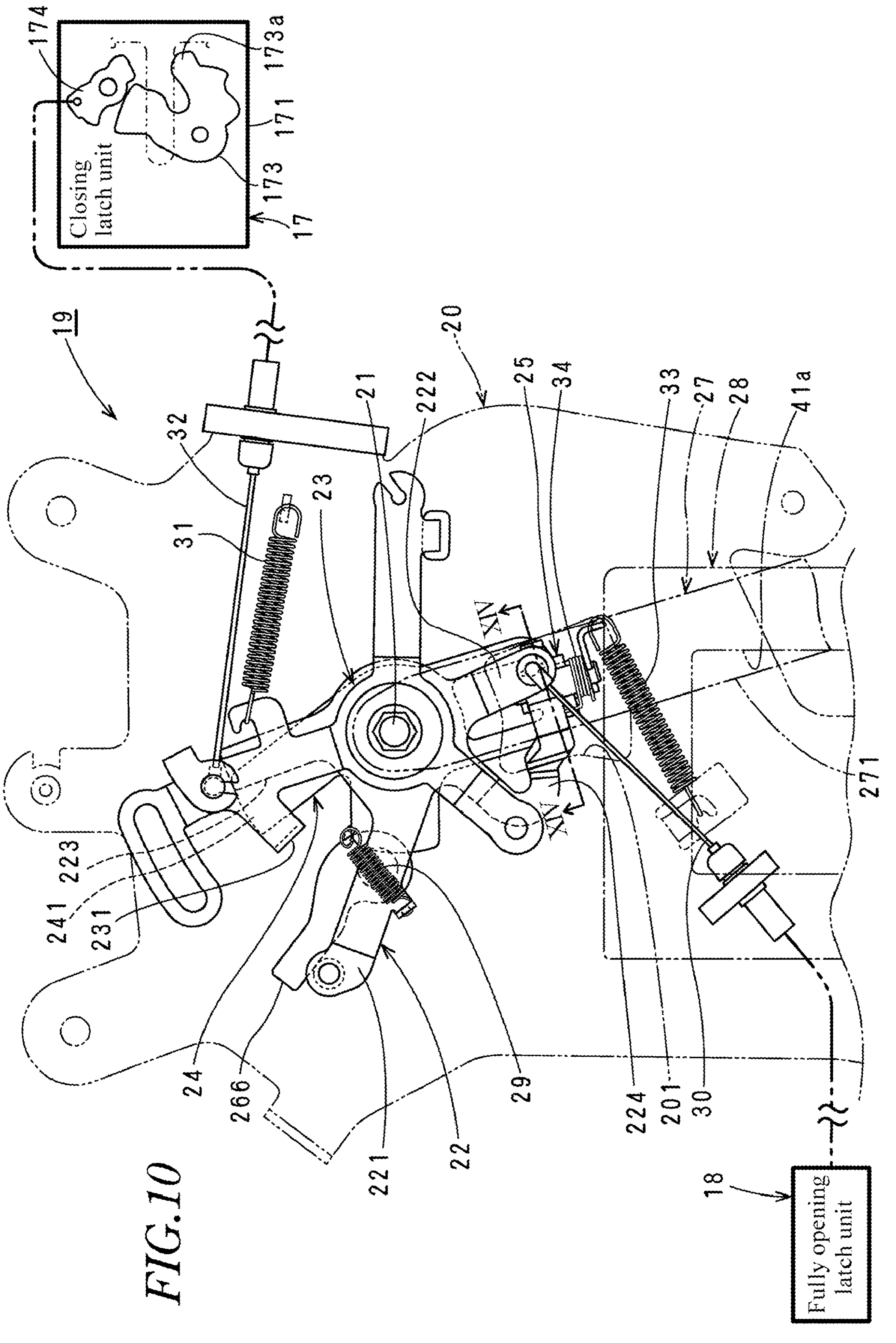
FIG. 10 is a side view showing the operation relay unit when an emergency handle is operated.

The holding member 25 capable of holding the emergency lever 24 in the unlatching position shown in FIG. 10 is provided on a lower portion of the emergency lever 24. Thus, when the emergency lever 24 is operated in the unlatching direction by the manual operation of the emergency handle 27, the emergency lever 24 is held in the unlatching position by the holding member 25, and thus the closed-state releasing lever 23 is held in the unlatching position, too. Moreover, when the closed-state releasing lever 23 is held in the unlatching position, the closing latch unit 17 is held in the unlatched state. Therefore, the ratchet 174 cannot engage with the engagement claw portion 173*a* of the latch 173 in the state of holding the emergency lever 24 in the unlatching position, and even if the rear sliding door 4 is closed, it is not held in the closed position.

Figure 6:
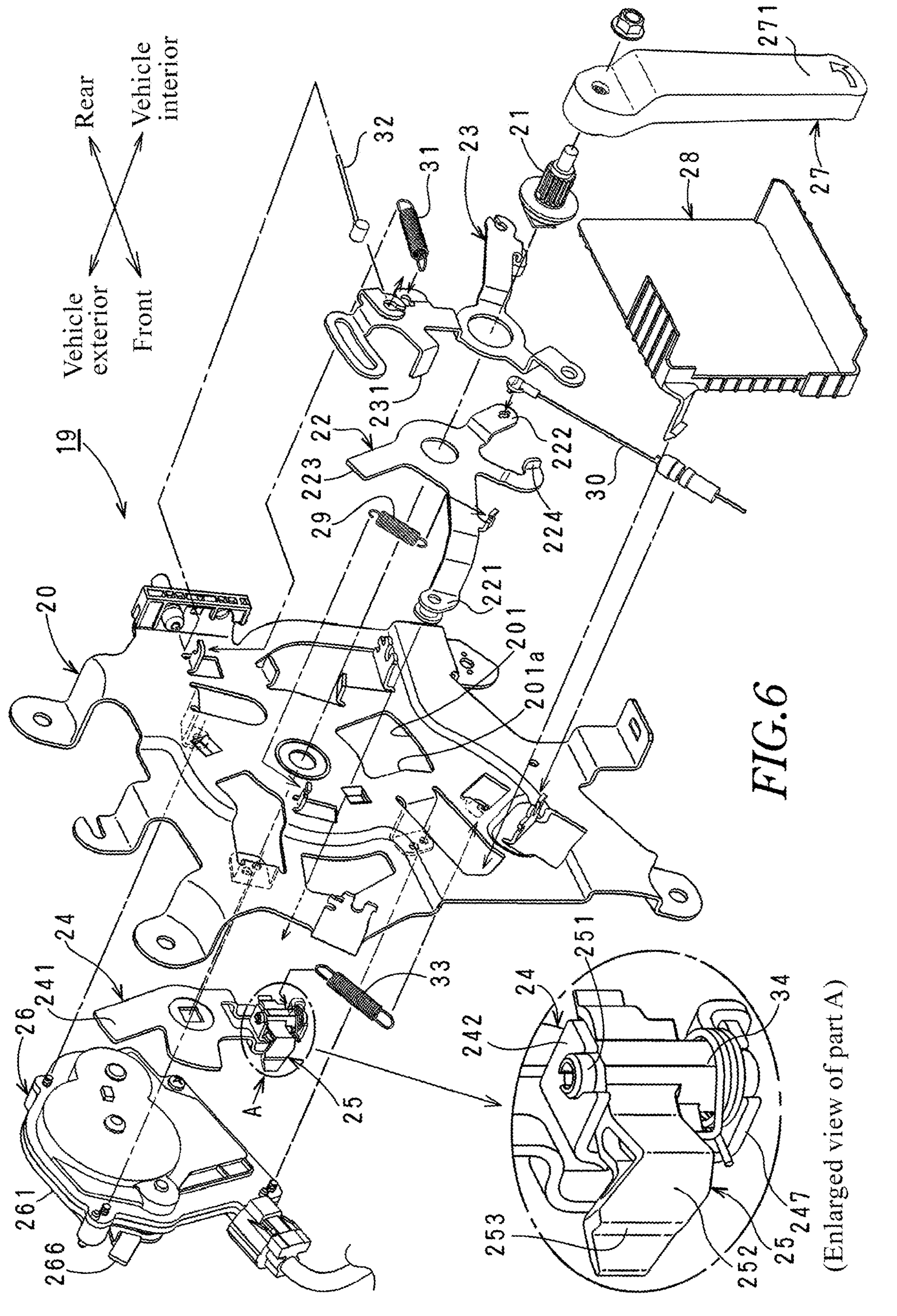
FIG. 6 is an exploded perspective view showing the operation relay unit.
Figure 7:
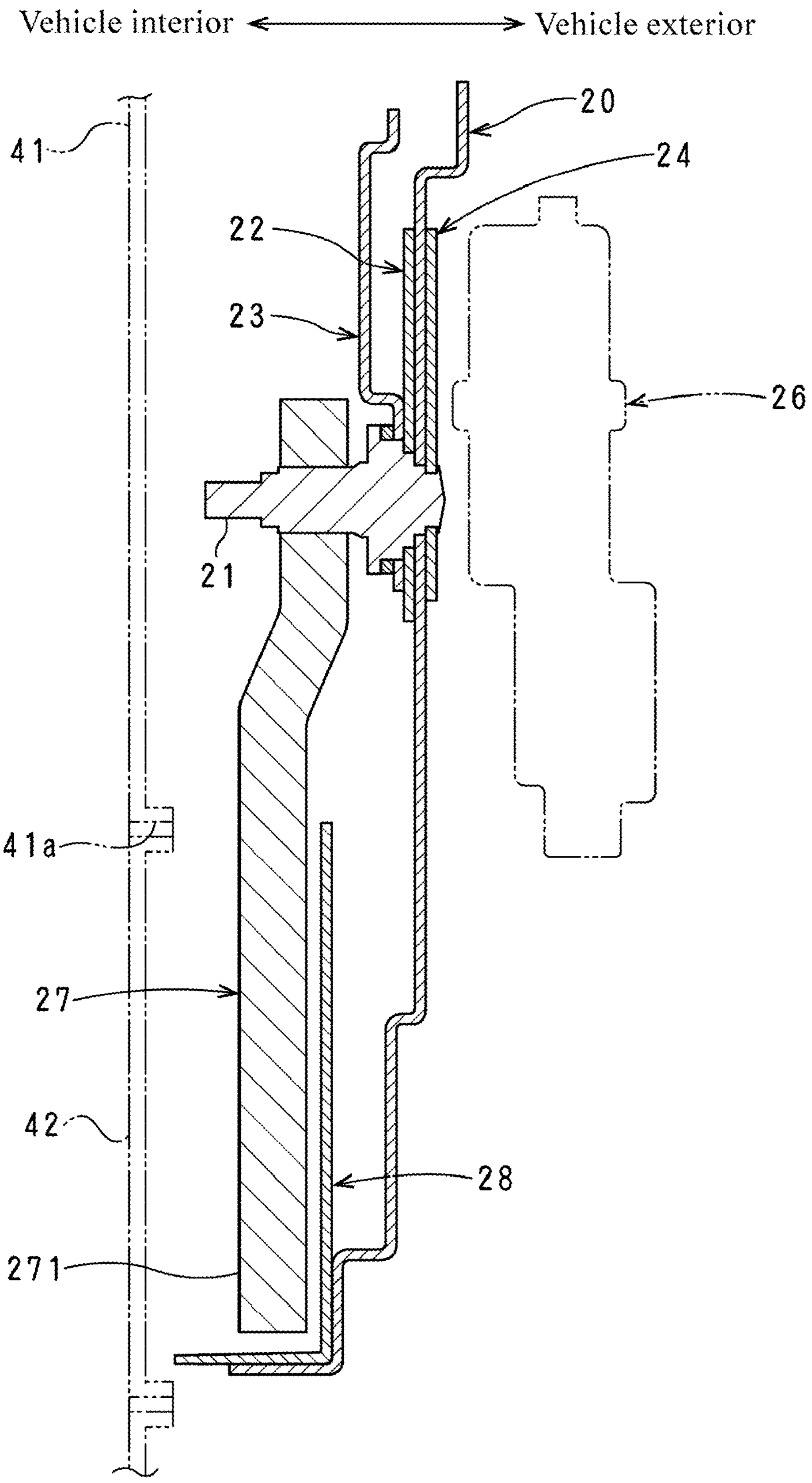
FIG. 7 is a cross-sectional view taken along the line VII-VII in FIG. 4.
Figure 12:
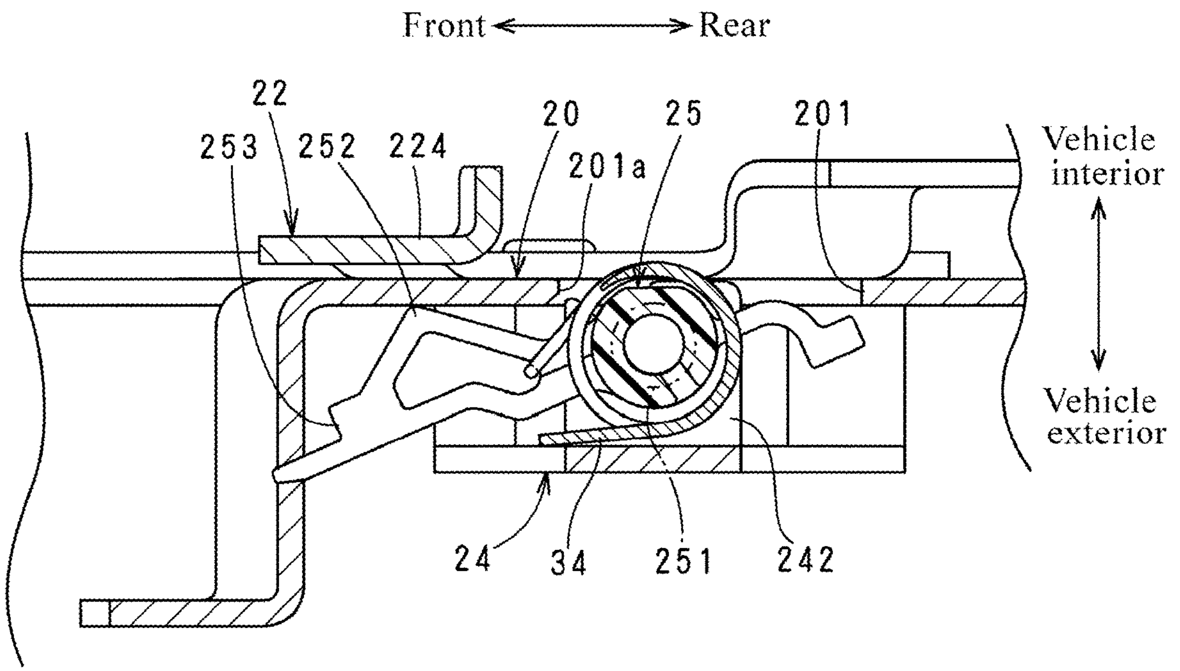
FIG. 12 is a cross-sectional view taken along the line XII-XII in FIG. 8.

As shown in FIG. 6, the holding member 25 is supported pivotably at a predetermined angle by a vertical shaft portion 251 supported by upper and lower support pieces 242, 242 provided on a lower portion of the emergency lever 24, and is biased by a spring 34, for example, in the clockwise direction in FIG. 12. The holding member 25 has a convex portion 252 formed in a chevron-like shape and an engaging stepped portion 253 formed with a level difference, on its front portion.

Figure 13:
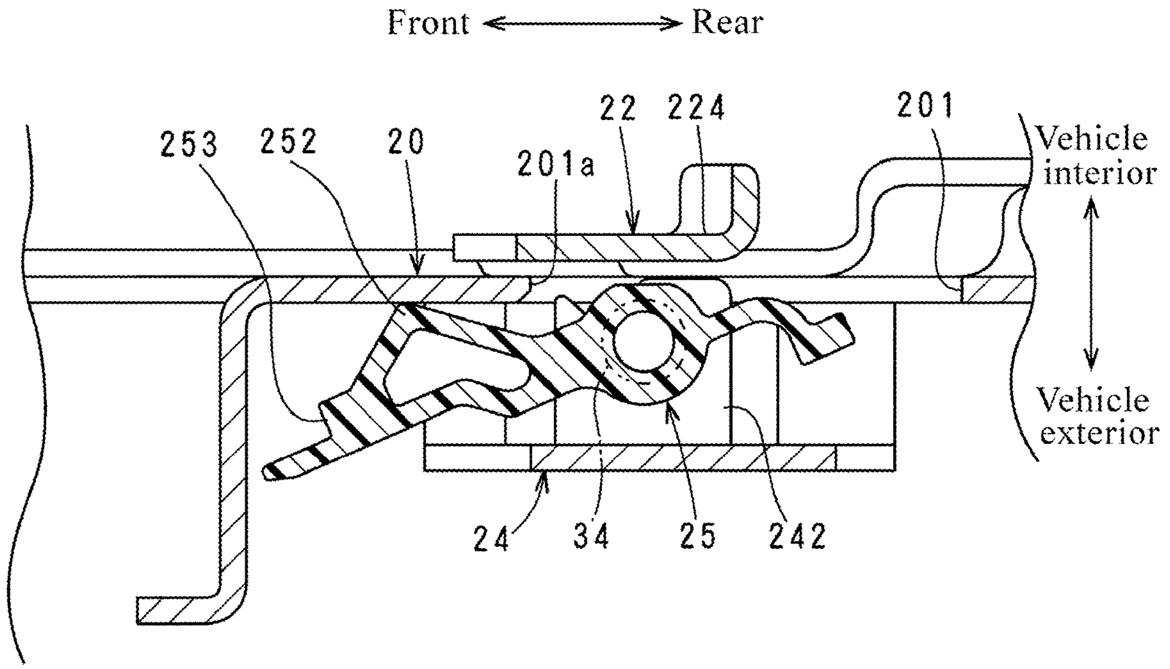
FIG. 13 is a cross-sectional view taken along the line XIII-XII in FIG. 9.
Figure 14:
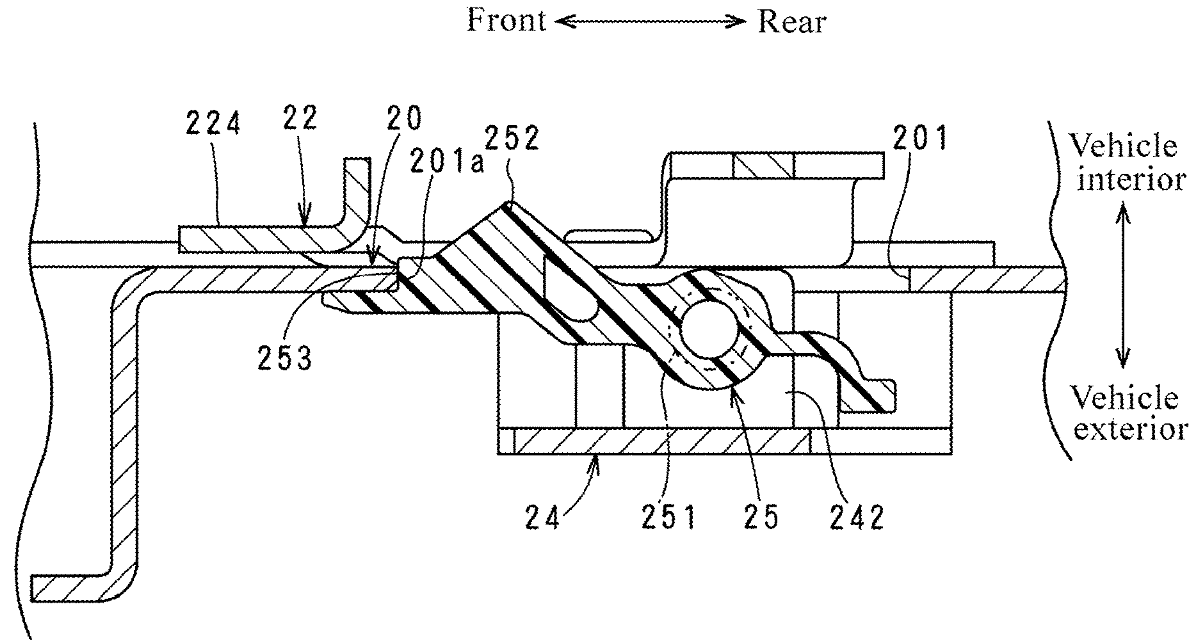
FIG. 14 is a cross-sectional view taken along the line XIV-XIV in FIG. 10.

The convex portion 252 is formed to protrude toward the vehicle-exterior-side surface of the baseplate 20 on the front portion of the holding member 25. When the emergency lever 24 is in a range between the initial position and the position before the unlatching position, the convex portion 252 contacts the vehicle-exterior-side surface of the baseplate 20 so as not to block the operation of the emergency lever 24 as shown in FIGS. 12, 13. When the emergency lever 24 moves to the unlatching position, the convex portion 252 enters into an aperture 201 formed on the baseplate 20 by a biasing force of the spring 34 as shown in FIG. 14. Thus, the holding member 25 is allowed to be in an engagement state by entering of the convex portion 252 into the aperture 201, and the engaging stepped portion 253 formed on a front side of the convex portion 252 engages with the engaged portion 201*a* which is an edge of the aperture 201 to hold the emergency lever 24 in the unlatching position.

Figure 11:
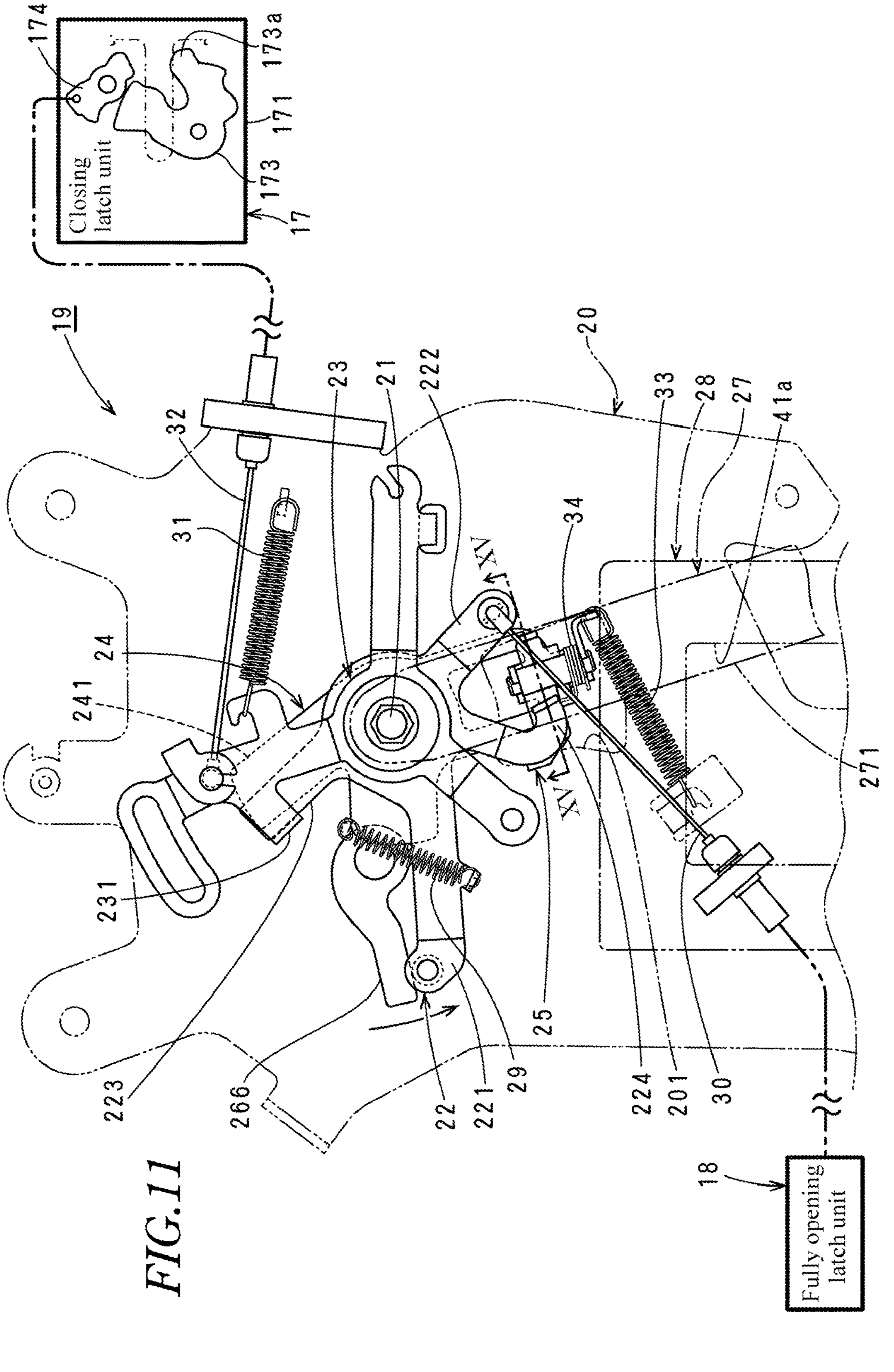
FIG. 11 is a side view showing the operation relay unit when an engagement state of a holding member is released by the driving of the actuator.
Figure 15:
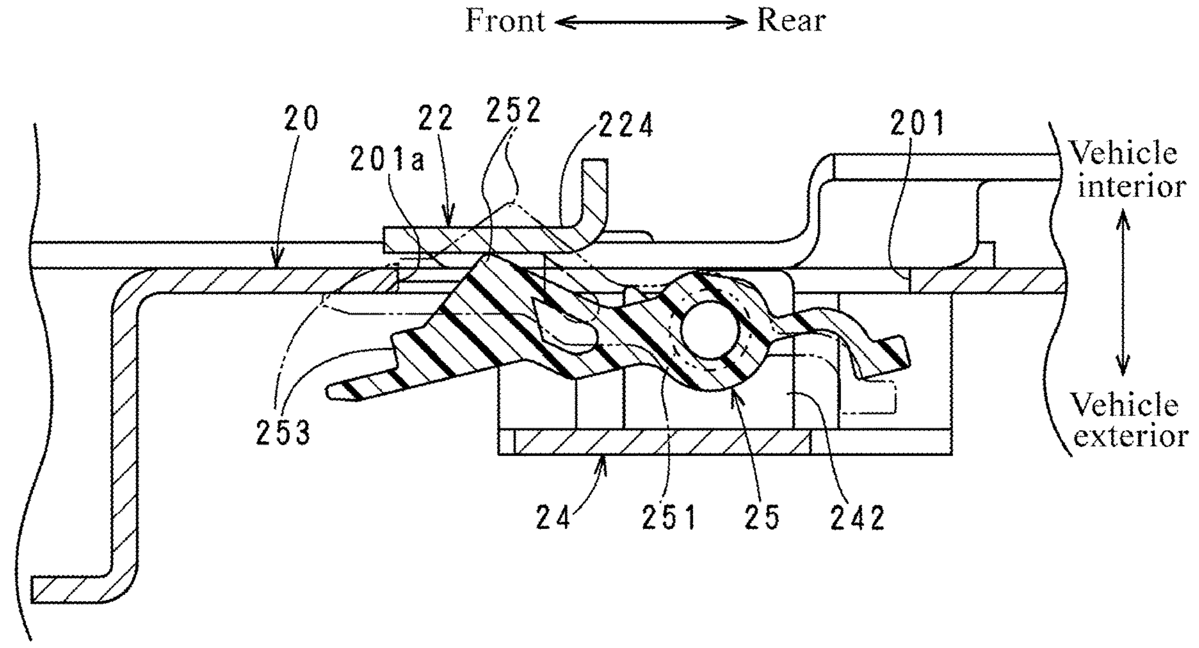
FIG. 15 is a cross-sectional view taken along the line XV-XV in FIG. 11.

The engagement relation between the holding member 25 and the engaged portion 201*a* is released by the operation of the fully-open-state releasing lever 22 in the unlatching direction based on the driving of the actuator 26. More specifically, in the case that the holding member 25 is in the engagement state, when the fully-open-state releasing lever 22 operates in the unlatching direction based on the actuator 26, the releasing portion 224 of the fully-open-state releasing lever 22 abuts against the convex portion 252 of the holding member 25 to push the holding member 25 from an engagement position shown by a two-dot chain line in FIG. 15 to a disengagement position shown by a solid line as shown in FIGS. 11, 15. Thus, the engaging stepped portion 253 of the holding member 25 is disengaged from the engaged portion 201*a* of the aperture 201 of the baseplate 20, and the emergency lever 24 and the closed-state releasing lever 23 are allowed to return to the respective initial positions. When the emergency lever 24 and the closed-state releasing lever 23 return to the respective initial positions by the respective biasing forces of the springs 33, 31, the ratchet 174 of the closing latch unit 17 is allowed to be in a state of engageable with the engagement claw portion 173*a* of the latch 173. Then, when the rear sliding door 4 is closed in this state, the closing striker 16 engages with the latch 173 and the ratchet 174 engages with the engagement claw portion 173*a* of the latch 173 to hold the rear sliding door 4 in the closed position.

The emergency handle 27 is inside of the rear sliding door 4, and is fixed to an end portion elongating in the vehicle interior side of the shaft 21 to pivot integrally with the emergency lever 24. Moreover, an operation portion 271 of the emergency handle 27 is provided to face an aperture 41*a* of a door trim 41 (see FIG. 7) of the rear sliding door 4, wherein the operation portion 271 can be gripped by a user. The aperture 41*a* of the door trim 41 is usually concealed by a cover 42 (see FIG. 7) such that the emergency handle 27 does not expose to the vehicle interior side. Thus, the emergency handle 27 is usually impossible to be operated owing to the concealment by the cover 42. However, when an emergency occurs such that an electrical system failure occurs to make the actuator 26 uncontrollable and make the rear sliding door 4 impossible to be opened by an electric operation, the manual operation of the emergency handle 27 is allowed by detaching the cover 42 to expose the operation portion 271 of the emergency handle 27 to the vehicle interior side.

When the operation portion 271 of the emergency handle 27 is manually operated by inserting the fingers of a user into the aperture 41*a* of the door trim 41 in the state that the manual operation of the emergency handle 27 is allowed, the closed-state releasing lever 23 can be operated in the unlatching direction via the emergency lever 24. Thus, even if an electrical system failure occurs and the rear sliding door 4 is in a state of being held in the closed position, the rear sliding door 4 can be opened based on the manual operation of the emergency handle 27.

Moreover, when the emergency lever 24 is in the state of being held in the unlatching position according to the manual operation of the emergency handle 27, the operation portion 271 of the emergency handle 27 deviates from the aperture 41*a* to be concealed in the backside of the door trim 41 as shown in FIG. 10. Thus, although the emergency handle 27 is necessary to be operated in the clockwise direction in FIG. 10 to return it to the usual position (initial position) from an operated position to where it has been moved by the manual operation, it is possible to prevent an operation mistake such that the emergency handle 27 is moved from the operated position to the initial position by a user because there is no clearance for inserting fingers between the emergency handle 27 and the aperture 41*a* in the state that the emergency handle 27 is held in the operated position.

The guard plate 28 is positioned to face the aperture 41*a* of the door trim 41, and is fixed to the baseplate 20 to be positioned in a space between the baseplate 20 and the emergency handle 27 of the operation relay unit 19 to block between the operation relay unit 19 and the aperture 41*a*. Thus, there is no risk that the fingers of a user wrongly contact the various operation components of the operation relay unit 19 when manually operating the emergency handle 27. Therefore, it is possible to prevent the operation relay unit 19 from an operation mistake.

Next, there is described the operation of the vehicle door operating device 1 of the present embodiment based on FIGS. 8 to 15.

(Door Opening/Closing Operation by Usual Electric Operation)

When the rear sliding door 4 is held in the closed position, the closing latch unit 17 is in the latched state by engaging with the closing striker 16, and the fully opening latch unit 18 is not in the engagement state with the fully opening striker. When the rear sliding door 4 is held in the fully open position, the fully opening latch unit 18 is in the latched state by engaging with the fully opening striker, and the closing latch unit 17 is not in the engagement state with the closing striker 16. Whether the rear sliding door 4 is in the closed position or the fully open position, all operation components of the operation relay unit 19 are in the respective initial positions shown in FIG. 8.

When opening the rear sliding door 4 from the closed position, the operation switch carried by a user or that provided on the rear sliding door 4 is operated. When operating any of the operation switches, the motor 262 of the actuator 26 is driven, and this driving is transmitted to the output lever 266 via the reduction gears 263, 264, 265. Thus, the output lever 266 pivots from the initial position shown in FIG. 8 in the counterclockwise direction to operate in the unlatching direction shown in FIG. 9.

The operation of the output lever 266 in the unlatching direction is transmitted to the fully-open-state releasing lever 22 by abutting the output lever 266 against the first arm portion 221 of the fully-open-state releasing lever 22. Thus, the fully-open-state releasing lever 22 operates against a biasing force of the spring 29 from the initial position shown in FIG. 8 to the unlatching position shown in FIG. 9. The operation of the fully-open-state releasing lever 22 in the unlatching direction is transmitted to the closed-state releasing lever 23 by abutting the third arm portion 223 against the abutted portion 231 of the closed-state releasing lever 23. Thus, the closed-state releasing lever 23 operates from the initial position in the unlatching direction.

The operation in the unlatching direction of the fully-open-state releasing lever 22 and that of the closed-state releasing lever 23 are respectively transmitted to the fully opening latch unit 18 and the closing latch unit 17 via the respective first and second operation force transmitting members 30, 32. Thus, the fully opening latch unit 18 and the closing latch unit 17 are allowed to be in the respective unlatched states. Thus, when the rear sliding door 4 is held in the closed position, the rear sliding door 4 can be opened by making the closing latch unit 17 to be the unlatched state, and when the rear sliding door 4 is held in the fully open position, the rear sliding door 4 can be closed by making the fully opening latch unit 18 to be in the unlatched state.

(In Case of Occurring of Electrical System Failure)

When an electrical system failure occurs, the actuator 26 is made to be impossible to drive. Therefore, even if the operation switch carried by a user or that provided on the rear sliding door 4 is operated, the rear sliding door 4 cannot be opened when the rear sliding door 4 is held in the closed position.

However, in the present embodiment, even if the actuator 26 is impossible to drive, the rear sliding door 4 can be opened by manually operating the emergency handle 27 from the vehicle interior side.

In the case of manually operating the emergency handle 27, the cover 42 attached to the door trim 41 of the rear sliding door 4 is detached to expose the operation portion 271 of the emergency handle 27. Then, the emergency handle 27 is operated from the initial position shown in FIG. 8 in the counterclockwise direction to move shown in FIG. 10 by inserting a hand of a user riding on the vehicle into the aperture 41*a* of the door trim 41. The operation of the emergency handle 27 is transmitted to the ratchet 174 of the closing latch unit 17 via the shaft 21, the emergency lever 24, the closed-state releasing lever 23, and the second operation force transmitting member 32. Thus, the ratchet 174 operates to be unlatched, and the rear sliding door 4 can be opened.

Moreover, the emergency lever 24 operates from the initial position to the unlatching position according to the emergency handle 27. Thus, the convex portion 252 of the holding member 25 moves rearward from a position where it contacts a surface of the baseplate 20 as shown in FIG. 12, and the holding member 25 pivots by the biasing force of the spring 34 to be in the engagement state in which the convex portion 252 enters into the aperture 201 as shown in FIG. 14.

When the emergency lever 24 shifts to the engagement state, the engaging stepped portion 253 engages with the engaged portion 201*a* of the aperture 201 of the baseplate 20 to prevent the emergency lever 24 from returning to the initial position, and holds the emergency lever 24 in the unlatching position.

When the emergency lever 24 is held in the unlatching position, the emergency handle 27 and the closed-state releasing lever 23 are also held in the respective unlatching positions, and the closing latch unit 17 is held in the unlatched state.

When the closing latch unit 17 is held in the unlatched state, since the ratchet 174 is not capable of engaging with the latch 173, even if the rear sliding door 4 is closed, the closing latch unit 17 is not allowed to be in the latched state. Thus, after the rear sliding door 4 is opened by the manual operation of the emergency handle 27, even if the rear sliding door 4 is closed accidentally, it is not held in the closed position.

As described above, when an electrical system failure occurs to make the actuator 26 uncontrollable and make the rear sliding door 4 impossible to be opened by an electric operation, the rear sliding door 4 can be opened by the manual operation of the emergency handle 27. After the rear sliding door 4 is opened by the manual operation of the emergency handle 27, since the closing latch unit 17 is not allowed to be in the latched state, the rear sliding door 4 opened on purpose is not closed accidentally.

To facilitate subsequent transportation of the vehicle to a repair shop and repairs, the rear sliding door 4 opened by the manual operation of the emergency handle 27 is moved to the fully open position and is held in this position by making the fully opening latch unit 18 to be in the latched state. Moreover, the emergency handle 9 provided in the front sliding door 3 can be operated when the rear sliding door 4 is held in the fully open position, and therefore the front sliding door 3 can be opened based on the operation of the emergency handle 9 as necessary.

Incidentally, when the emergency handle 27 is in the state of being held in the unlatching position, a part of the operation portion 271 of the emergency handle 27 deviates from the aperture 41*a* to be concealed in the backside of the door trim 41. Thus, it is capable of preventing an operation mistake such that the emergency handle 27 held in the unlatching position is returned to the initial position.

When the repairs are finished to enable the actuator 26 to drive, the actuator 26 is driven to operate the fully-open-state releasing lever 22 in the unlatching direction. When the fully-open-state releasing lever 22 operates in the unlatching direction, as shown in FIGS. 11, 15, the releasing portion 224 of the fully-open-state releasing lever 22 goes on the convex portion 252 of the holding member 25 to push the holding member 25 from the position shown by the two-dot chain line to the position shown by the solid line in FIG. 15. Thus, the engaging stepped portion 253 of the holding member 25 disengages from the engaged portion 201*a* of the aperture 201 of the baseplate 20, and the emergency lever 24 returns to the initial position by a biasing force of the spring 33. The emergency handle 27 and the closed-state releasing lever 23 return to the respective initial positions, too. Moreover, the ratchet 174 of the closing latch unit 17 returns to the engagement position to allow the closing latch unit 17 to be in a state capable of engaging with the closing striker 16.

As described above, the foregoing relates to one example of the present invention, but the present invention is not limited to the above embodiment and various changes and modifications may be added to the present embodiment without departing from the gist of the present invention as follows.

(1) The vehicle door operating device 1 is applied to a swing-type door.

(2) The holding member 25 is supported on the baseplate 20, and the engaged portion 201*a* is formed on the emergency lever 24.

What is claimed is:

1. A vehicle door operating device comprising:

a closing latch unit holding a door in a closed position, wherein the door is supported on a vehicle body to open and close;

a fully opening latch unit holding the door in a fully open position;

an actuator having a motor;

an emergency handle operated manually from a vehicle interior side; and an operation relay unit which operates the closing latch unit and the fully opening latch unit to be unlatched respectively when driven by the actuator, and operates the closing latch unit in a latched state to be unlatched and be held in an unlatched state when manually operated by the emergency handle such that even if the door is closed after the door is opened by the emergency handle, the closing latch unit is not latched and the door is not held in the closed position.

2. The vehicle door operating device according to claim 1, wherein the operation relay unit does not operate the fully opening latch unit to be unlatched when manually operated by the emergency handle.

3. The vehicle door operating device according to claim 2, wherein the operation relay unit comprises;

a baseplate;

a fully-open-state releasing lever which is supported to the baseplate and is coupled with the fully opening latch unit to operate this unit to be unlatched based on the driving of the actuator;

a closed-state releasing lever which is supported to the baseplate and is coupled with the closing latch unit to operate this unit to be unlatched based on the driving of the actuator;

an emergency lever which is supported to the baseplate and is operated in an unlatching direction based on the manual operation of the emergency handle to operate the closed-state releasing lever in an unlatching direction without operating the fully-open-state releasing lever in an unlatching direction; and a holding member holding the emergency lever in an unlatching position to hold the closed-state releasing lever in an unlatching position such that even if the door is closed after the door is opened by the emergency handle, the closing latch unit is not latched and the door is not held in the closed position when the emergency lever pivots in the unlatching direction.

4. The vehicle door operating device according to claim 3, wherein the holding member holds the emergency lever in the unlatching position by engaging with an engaged portion formed on the baseplate based on the manual operation of the emergency handle, and allows the emergency lever to return from the unlatching position to an initial position by disengaging from the engaged portion based on the operation of the fully-open-state releasing lever in the unlatching direction according to the driving of the actuator.

5. The vehicle door operating device according to claim 4, wherein the holding member is supported by the emergency lever to engage with the engaged portion by a biasing force of a spring.

6. The vehicle door operating device according to claim 5, wherein the holding member is supported pivotably at a predetermined angle on the emergency lever and has a convex portion protruding toward an opposing surface of the base plate, and wherein when the emergency lever moves to the unlatching position, the convex portion enters into an aperture as the engaged portion formed on the baseplate by the biasing force of the spring, and the holding member is allowed to be in an engagement state to hold the emergency lever in the unlatching position.

7. The vehicle door operating device according to claim 3, wherein the emergency handle is operated manually from the initial position in the unlatching direction by opening an aperture formed on a door trim of the door to expose an operation portion of the emergency handle, and when the emergency lever is held in the unlatching position, a part of the operation portion is concealed in a backside of the door trim such that the operation portion is impossible to be operated manually.

8. The vehicle door operating device according to claim 7, wherein a guard plate blocking between the operation relay unit and the aperture is provided at a position facing the aperture of the door trim between the operation relay unit and the emergency handle.

9. The vehicle door operating device according to claim 1, wherein the operation relay unit comprises;

a baseplate;

a fully-open-state releasing lever which is supported to the baseplate and is coupled with the fully opening latch unit to operate this unit to be unlatched based on the driving of the actuator;

a closed-state releasing lever which is supported to the baseplate and is coupled with the closing latch unit to operate this unit to be unlatched based on the driving of the actuator;

an emergency lever which is supported to the baseplate and is operated in an unlatching direction based on the manual operation of the emergency handle to operate the closed-state releasing lever in an unlatching direction without operating the fully-open-state releasing lever in an unlatching direction; and a holding member holding the emergency lever in an unlatching position to hold the closed-state releasing lever in an unlatching position such that even if the door is closed after the door is opened by the emergency handle, the closing latch unit is not latched and the door is not held in the closed position when the emergency lever pivots in the unlatching direction.

10. The vehicle door operating device according to claim 9, wherein the holding member holds the emergency lever in the unlatching position by engaging with an engaged portion formed on the baseplate based on the manual operation of the emergency handle, and allows the emergency lever to return from the unlatching position to an initial position by disengaging from the engaged portion based on the operation of the fully-open-state releasing lever in the unlatching direction according to the driving of the actuator.

11. The vehicle door operating device according to claim 10, wherein the holding member is supported by the emergency lever to engage with the engaged portion by a biasing force of a spring.

12. The vehicle door operating device according to claim 11, wherein the holding member is supported pivotably at a predetermined angle on the emergency lever and has a convex portion protruding toward an opposing surface of the base plate, and wherein when the emergency lever moves to the unlatching position, the convex portion enters into an aperture as the engaged portion formed on the baseplate by the biasing force of the spring, and the holding member is allowed to be in an engagement state to hold the emergency lever in the unlatching position.

13. The vehicle door operating device according to claim 9, wherein the emergency handle is operated manually from the initial position in the unlatching direction by opening an aperture formed on a door trim of the door to expose an operation portion of the emergency handle, and when the emergency lever is held in the unlatching position, a part of the operation portion is concealed in a backside of the door trim such that the operation portion is impossible to be operated manually.

14. The vehicle door operating device according to claim 13, wherein a guard plate blocking between the operation relay unit and the aperture is provided at a position facing the aperture of the door trim between the operation relay unit and the emergency handle.

* * * * *